United States Patent

Moreau

Patent Number: 6,052,290
Date of Patent: Apr. 18, 2000

[54] SWITCH-MODE SUPPLY WITH POWER FACTOR CORRECTION

[75] Inventor: Jean-Michel Moreau, Grenoble, France

[73] Assignee: SGS-Thomson Microelectronics S.A., Gentilly, France

[21] Appl. No.: 09/184,923

[22] Filed: Nov. 2, 1998

Related U.S. Application Data

[62] Division of application No. 08/739,705, Oct. 29, 1996, Pat. No. 5,867,374.

[30] Foreign Application Priority Data

Oct. 30, 1995 [FR] France .................................. 95 13041

[51] Int. Cl.[7] .......................... H02M 3/335; H02M 7/537
[52] U.S. Cl. .............................................. 363/20; 363/131
[58] Field of Search ................... 363/16, 21, 20, 363/97, 98, 131, 124

[56] References Cited

U.S. PATENT DOCUMENTS

| | | | |
|---|---|---|---|
| 4,007,413 | 2/1977 | Fisher et al. ............................... | 363/18 |
| 4,268,898 | 5/1981 | Brown ........................................ | 363/20 |
| 4,280,174 | 7/1981 | Sonda ........................................ | 363/24 |
| 4,905,136 | 2/1990 | Tanaka ..................................... | 363/124 |
| 4,928,220 | 5/1990 | White ........................................ | 363/56 |
| 5,420,776 | 5/1995 | Preller ....................................... | 363/18 |
| 5,459,650 | 10/1995 | Noro ........................................ | 363/24 |
| 5,528,483 | 6/1996 | Mohandes ................................. | 363/21 |

OTHER PUBLICATIONS

French Search Report from French Patent Application No. 95 13041, filed Oct. 30, 1995.

*Primary Examiner*—Edward H. Tso
*Assistant Examiner*—Rajnikant B. Patel
*Attorney, Agent, or Firm*—Wolf, Greenfield & Sacks, P.C.; James H. Morris; Theodore E. Galnthay

[57] ABSTRACT

A circuit for providing a rectified voltage to a flyback switch-mode supply circuit comprises a rectifying bridge having output terminals; a primary winding of the switch-mode supply having an intermediate tap; a switch serially connected with the primary winding; the serial connection between the output terminals, of a first diode and a capacitor, the first diode being biased so as to allow the charging of the capacitor; a second diode between a first output terminal of the winding, the second and third diodes being biased so as to let the current flow towards a second terminal of the winding.

12 Claims, 1 Drawing Sheet

SWITCH-MODE SUPPLY WITH POWER FACTOR CORRECTION

This application is division of application Ser. No. 08/739,705 filed on Oct. 29, 1996 now U.S. Pat. No. 5,867,374.

BACKGROUND OF THE INVENTION

1. Field of the Invention

The invention relates to flyback switch-mode supplies and more particularly to such power supplies provided with a power factor correction system

2. Discussion of the Related Art

Switch-mode power supplies with a power factor correction are known. An example is disclosed in the publication of the RCA laboratories, MRZ-339, March 1992, entitled "Single Converter High Power Factor SWITCH-MODE POWER SUPPLY" by M. Megeid.

The attached FIG. 1 reproduces the main elements of Figure 2A of this document.

Terminals A and B of the mains network are connected to a full wave rectifying bridge BR, having positive and negative output terminals X and Y connected to a primary winding W1 in series with a switch S1 of a switch-mode flyback supply source. This switch-mode supply source comprises a secondary winding W2 coupled to winding W1 and to a rectifier so that no current may flow in winding W2 when winding W1 is conductive and that a current is transferred only when the conduction in winding W1 is terminated. The secondary circuit of this switch-mode supply source conventionally comprises a diode D in series with a storing capacitor C. A load L is parallel-connected with capacitor C.

Between terminals X and Y is arranged a storage capacitor C1. The cited document provides a specific arrangement to improve the power factor, that is for the mains network to provide a current during a time that is longer than the time necessary for charging the capacitor. This arrangement comprises, between terminals X and Y, the serial connection of capacitor C1, a diode D1 and a switch S2. Diode D1 is biased for inhibiting the charging of capacitor C1 by the rectified voltage present between terminals X and Y. The charging of capacitor C1 is due to the connection of this capacitor C1 across an auxiliary winding W3 in series with diode D2. Diode D2 is biased so that capacitor C1 may be charged. According to a feature of this circuit, winding W3 is coupled with winding W1 in the flyback mode, that is, it operates with winding W1, not as a voltage transformer, but for conducting an alternating current.

An advantage of this circuit, as explained in the above article, is that any desired value of the voltage across capacitor C1 can be selected.

However, this circuit has two major drawbacks.

A first drawback is that, due to the flyback connection of winding W3 with respect to winding W1, like winding W2 with respect to winding W1, the voltage across capacitor C1 is linked to the regulated voltage determined by switch S1. Therefore, this voltage does not follow the mains voltage.

A second drawback is that, due to the flyback connection of winding W3 with respect to winding W1, it is necessary to provide a switch S2 connected as shown. This switch S2 has the drawbacks of being costly and of needing a control circuit.

Another drawback of this circuit is that the power available on winding W3 results from the energy provided by winding W1. Therefore, while switch S1 is closed, the current in the switch is more important than the current that is normally necessary for the switch-mode supply, whereby it is necessary to oversize switch S1 and therefore increase its cost.

SUMMARY OF THE INVENTION

The invention aims at providing a switch-mode supply circuit with a power factor correction maintaining the advantages of the prior art circuits and avoiding their drawbacks.

An object of the invention is to provide a switch-mode supply circuit simpler than the prior art circuit.

Another object of the present invention is to provide a switch-mode supply circuit easier to control than the prior art circuit.

To achieve these objects, the invention provides a circuit for providing a rectified voltage to a flyback switch-mode supply circuit, comprising a rectifying bridge having positive and negative output terminals; a primary winding of the switch-mode supply having an intermediate tap and first and second main terminals; a switch serially connected with said primary winding; the serial connection, between said output terminals, of a first diode and a capacitor, the first diode being biased so as to allow the charging of the capacitor from said output terminals; a second diode between a first of said output terminals and the intermediate tap; and a third diode between the junction of the first diode and the capacitor and a first main terminal of said winding, the second and third diodes being biased so as to let the current flow towards a second main terminal of the winding.

According to an embodiment of the invention, the circuit comprises an impedance in series with the first diode and the capacitor.

According to an embodiment of the invention, the winding comprises a first plurality n1 of turns on one side of the intermediate tap and a second plurality n2 of turns on the other side of the intermediate tap, n1 and n2 being selected so that the ratio $n2/(n1+n2)$ equals substantially 70%.

BRIEF DESCRIPTION OF THE DRAWINGS

The foregoing and other objects, features, aspects and advantages of the invention will become apparent from the following detailed description of embodiments, given by way of illustration and not of limitation with reference to the accompanying drawings, among which.

DETAILED DESCRIPTION

Figure 1:
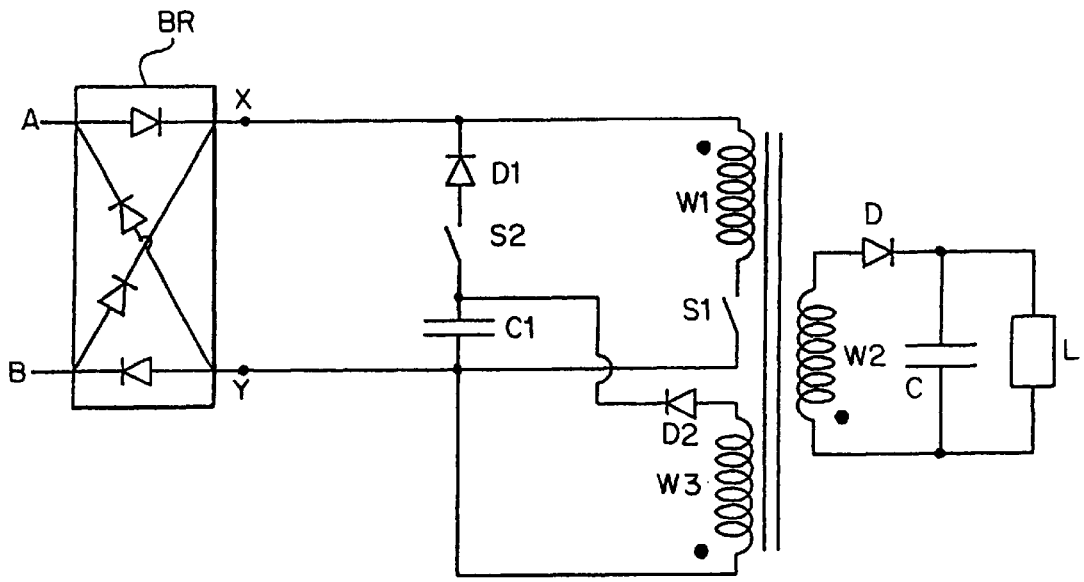
FIG. 1, above disclosed, represents a prior art switch-mode power supply with improved power factor.
Figure 2:
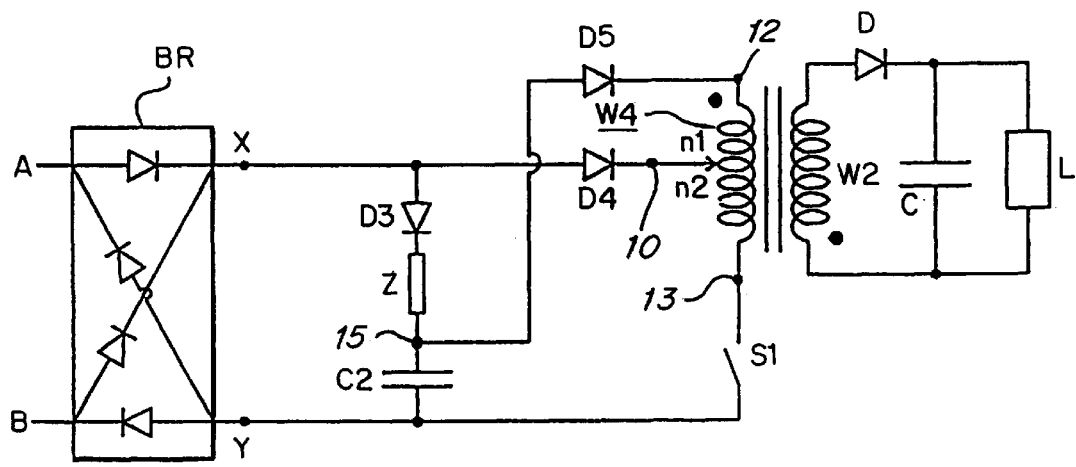
FIG. 2 illustrates an embodiment of the circuit according to the invention.

The circuit of FIG. 2 comprises a rectifying bridge BR and a switch-mode supply circuit as generally disclosed in connection with FIG. 1.

Between the output terminals X and Y of the rectifying bridge are serially connected a diode D3, an impedance Z and a capacitor C2. The primary winding of the switch-mode supply, in series with the switch S1, is a winding W4 provided with an intermediate tap 10. The upper terminal of the winding is referenced 12 and the lower terminal is referenced 13. Terminal X is connected to the intermediate tap 10 through a diode D4. The junction 15 of capacitor C2 and impedance Z is connected to terminal 12 through a diode D5. Diodes D4 and D5 are biased so as to let a positive current flow towards terminal Y when switch S1 is closed.

In this circuit, capacitor C2, connected through diode D3 and impedance Z between the output terminals X and Y of the rectifying bridge, charges substantially to the peak voltage Vp of the mains network.

It will be assumed that winding W4 comprises n1 turns between the intermediate tap and terminal 12 and n2 turns between the intermediate tap 10 and terminal 13.

When the mains voltage is higher than a determined value V1, such as:

$$V1=[n2/(n1+n2)]Vp,$$

the supply voltage arrives from the mains network through diode D4. Indeed, in this case, terminal 12 is at a voltage higher than the value Vp and diode D5 is reverse biased.

When the mains voltage drops below value V1, diode D5 is forward biased and it is the capacitor C2 that supplies the winding W4.

With this particularly simple arrangement, it is possible, by selecting the ratio n1/n2, to set the time at which the capacitor C2 will relay the mains for supplying the circuit. The duration of the supplying from the mains will be chosen more or less long as a function of the desired improvement of the power factor. For example, the numbers of turns n1 and n2 will be selected so that the ratio n1/(n1+n2) is about 70% so that the capacitor relays the rectified supply voltage for supplying the primary winding when the mains voltage drops below 70% of its peak value.

An advantage of the arrangement of FIG. 2 is that the current necessary for charging capacitor C2 does not flow through switch S1 which will therefore not have to be oversized with respect to the switch of a switch-mode supply not provided with a power factor correction system.

Of course, the present invention is likely to have various alterations, modifications and improvements which will readily occur to those skilled in the art. Such alterations, modifications, and improvements are intended to be part of this disclosure, and are intended to be within the spirit and the scope of the invention. Accordingly, the foregoing description is by way of example only and is not intended to be limiting. The invention is limited only as defined in the following claims and the equivalents thereto.

What is claimed is:

1. A method for transferring a rectified voltage to a supply voltage with power factor correction, comprising the steps of:
    selecting a determined value, based on a desired improvement of power factor correction, that sets a time at which a charge storage device provides said supply voltage;
    connecting said charge storage device to said rectified voltage when said rectified voltage is greater than a charge storage device voltage associated with said charge storage device;
    providing said rectified voltage as said supply voltage when said rectified voltage is greater than said determined value; and
    providing said charge storage device voltage as said supply voltage when said rectified voltage is less than said determined value.

2. The method of claim 1, wherein said determined value is related to a peak value of said rectified voltage.

3. The method of claim 2, wherein said determined value is substantially 70% of said peak value.

4. A circuit for transferring a rectified voltage between a first rectified voltage terminal and a second rectified voltage terminal to a supply voltage with power factor correction between one of a first and a second supply terminal and a third supply terminal, comprising:
    first means for connecting a charge storage device to said first rectified voltage terminal through a charge path when said rectified voltage is greater than a charge storage device voltage associated with said charge storage device;
    second means for connecting said first rectified voltage terminal to said second supply terminal when said rectified voltage is greater than a determined value, whereby said supply voltage is provided between said second supply terminal and said third supply terminal; and
    third means for connecting said charge storage device to said first supply terminal when said rectified voltage is less than said determined value, whereby said supply voltage is provided between said first supply terminal and said third supply terminal.

5. The circuit of claim 4, further comprising a controllable switch for connecting said second rectified voltage terminal to said third supply terminal.

6. The circuit of claim 4, wherein said first, second and third means are diodes.

7. The circuit of claim 4, wherein said charge storage device is a capacitor.

8. The circuit of claim 7, wherein said charge path comprises a series connection of a diode and an impedance, said diode being biased so as to allow charging of said capacitor from said first and second rectified voltage terminals.

9. The circuit of claim 4, wherein said determined value is related to a peak value of said rectified voltage.

10. The circuit of claim 4, further comprising a transformer, wherein said first, second and third supply terminals are respectively connected to an upper, intermediate and lower terminal of a primary winding of said transformer, said primary winding comprising;
    a first plurality n1 of turns between said upper terminal and said intermediate terminal; and
    a second plurality n2 of turns between said intermediate terminal and said lower terminal.

11. The circuit of claim 10, wherein a ratio defined by n2/(n1+n2) determines a relationship between said determined value and said peak value.

12. The circuit of claim 11, wherein n1 and n2 are selected such that said determined value is substantially 70% of said peak value.

* * * * *